Patented May 4, 1948

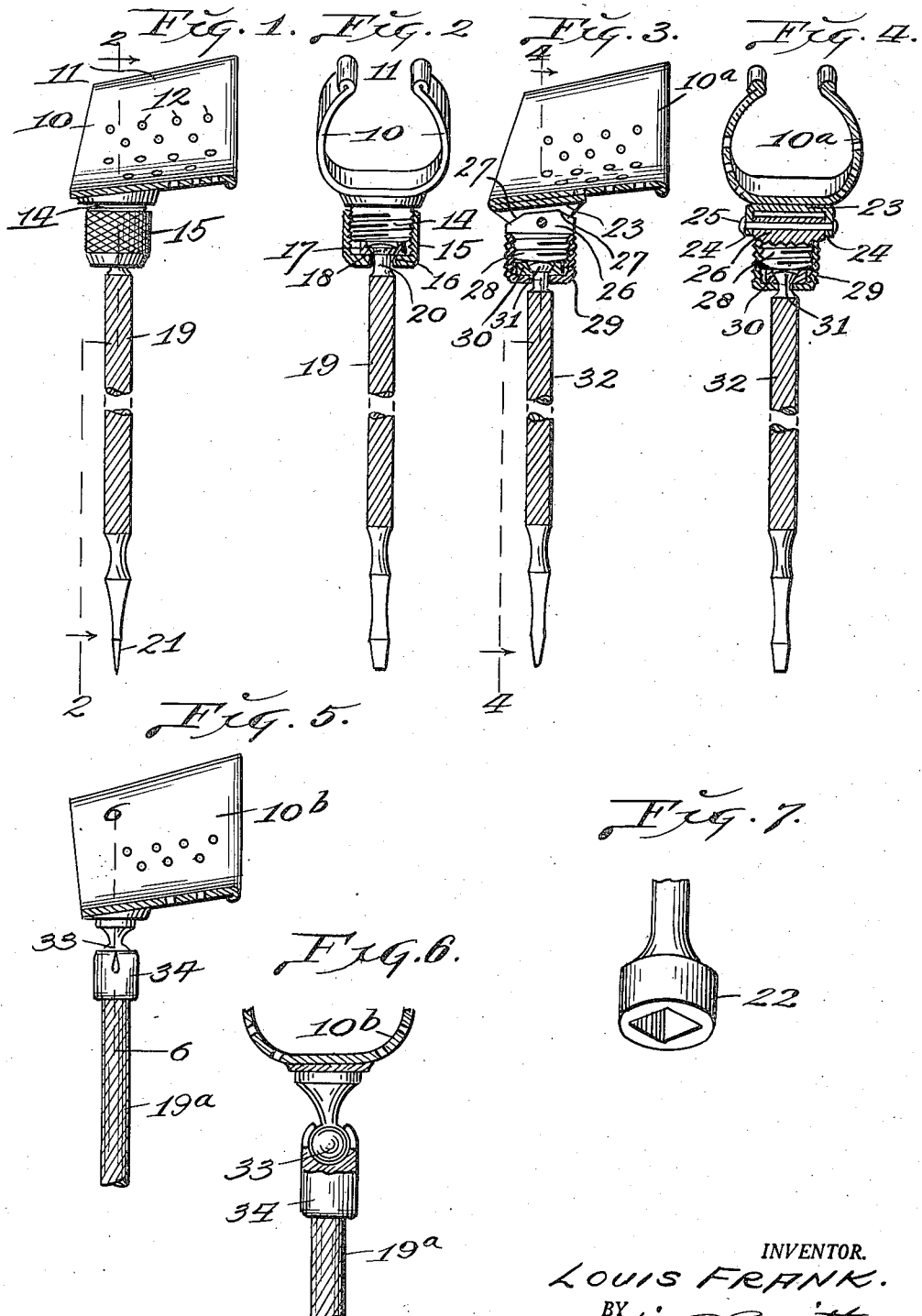

2,440,854

UNITED STATES PATENT OFFICE 2,440,854

SCREW OR NUT DRIVER

Louis Frank, Fellows, Calif.

Application August 14, 1944, Serial No. 549,417

2 Claims. (Cl. 145—50)

My invention relates to a screw or nut driving tool and has for its principal objects, to combine with the shank of a screw or nut driver, particularly the smaller sizes, a thimble adapted to receive and be carried upon the end of the index finger, thereby providing a convenient connection between the finger and tool, so as to effect a material saving of time in the manipulation and use of the tool, and further, to provide a simple, flexible or swivelled joint between the thimble and tool, in order to enable the latter to be readily rotated by the second finger and thumb of the user's hand.

A further object of my invention is, to provide a tool of the character referred to, which will be highly effective in the saving of time when used by workmen engaged in assembling structures having large numbers of small screws of different sizes, for instance chronometers, typewriters, adding machines, cameras, guages, electrical apparatus, radio sets, and instruments used in the control and navigation of ships, aircraft and the like.

With the foregoing and other objects in view, my invention consists in certain novel features of construction and arrangement of parts which will be hereinafter more fully described and claimed and illustrated in the accompanying drawings in which:

Fig. 1 is an elevational view of a screw and nut driving tool constructed in accordance with my invention with the thimble shown in vertical section.

Fig. 2 is a vertical section taken on the line 2—2 of Fig. 1.

Fig. 3 is an elevational view of a modified form of the tool with the thimble in vertical section.

Fig. 4 is a vertical section taken on the line 4—4 of Fig. 3.

Fig. 5 is an elevational view of the upper portion of a further modification with the thimble in vertical section.

Fig. 6 is an enlarged cross sectional view taken on the line 6—6 of Fig. 5.

Fig. 7 is a perspective view of the end of a tool shank having a socket for the reception of nuts or bolt heads.

Referring by numerals to the accompanying drawings, and particularly to the form of tool illustrated in Figs. 1 and 2, 10 designates the thimble member of the tool, which member has the general shape of a short tube with a longitudinally disposed slot or opening 11 at its top, and said member being formed of thin, pliable material having a certain degree of resilience, for instance, sheet metal, plastics or the like, in order that the thimble may be contracted or expanded so as to fit conveniently on the index finger of the user's hand.

Member 10 may taper slightly toward its forward end and for ventilation purposes the lower portion and sides of said member may be perforated as designated by 12. Opening 11 in the top of thimble 10 is somewhat narrower than the end of the index finger and thus said thimble is applied, worn or removed after the manner of a conventional sewing thimble.

Secured to the forward portion of the lower side of the thimble, is a depending threaded stud 14 which receives a socket nut 15 having an aperture 16 in its lower end, and clamped between stud 14 and said nut is a disc 17, in which is swivelled a head 18, that is formed on the upper end of a short rod 19, which functions as the tool shank.

The portion of this shank adjacent head 18 is reduced in diameter as designated by 20 and passes through the aperture 16 in nut 15. The surface of shank 19 is knurled and its lower end is shaped to form a conventional screw driven bit, such as 21, or a socket such as 22 (Fig. 7).

In the use of the tool, thimble 10 is applied to the end of the index finger and shank 19 is rotated by the thumb and second finger, thereby rapidly performing the screw driving operation, or the rotation of a nut or bolt where the shank is provided with a socket.

There may be a slight degree of play between neck 20 and nut 15 and between head 18 and disc 17, thus giving the tool a certain degree of flexibility during use.

In the modification illustrated in Figs. 3 and 4, a plate 23, which may be formed integral with the forward end of thimble 10a, underlies and is secured by welding or otherwise to forward portion of said thimble and formed integral with the sides of said plate are depending ears 24.

Positioned between ears 24 and pivoted thereto by a transverse pin 25, is a block 26, having oppositely arranged inclined faces 27 on its upper end portions which engage the underface of plate 23 and thereby limit the swinging movement of said block.

Depending from block 26 is a threaded stud 28, to the under surface of which is clamped, by means of a socket nut 29, a disc 30, in which is swivelled a head 31 on the upper end of shank 32, similar to shank 19.

In this form of tool, the shank, due to the provision of the pivot 25, may be swung through an arc, limited by the faces 27.

In the form of tool illustrated in Figs. 5 and 6, the thimble 10b is connected to shank 19a by a universal joint, preferably of the type employing a ball 33 secured to the thimble and a socket 34 on the upper end of the shank.

All parts of my improved tool may be made wholly or partially of metal, plastics or the like, and the end of the shank may be provided with a square or hexagonal socket, or with bits shaped so as to engage the heads of special screws such as the Phillips, Allen, Bristow and others.

In Figs. 1 and 2 I have shown the socket nut with an internal thread and with its outer surface knurled, whereas in Figs. 3 and 4 the nut is shown as being formed of sheet metal with a thread pressed in the circumferential wall.

The internal diameter of the socket nut should be such as to readily accommodate the different sizes of discs which are swivelled on the ends of the screw driver shanks.

Thus it will be seen that I have provided a screw and nut driver which is simple in structure, inexpensive of manufacture and very effective in performing the functions for which it is intended.

It will be understood that minor changes in the size, form and construction of the various parts of my improved screw and nut driver may be made and substituted for those herein shown and described without departing from the spirit of the invention, the scope of which is set forth in the appended claims.

I claim as my invention:

1. The combination with a split thimble adapted to receive the end of a finger, spaced ears depending from the underside of said thimble, a stud having its upper portion positioned between said ears, a transversely disposed pin pivotally connecting said stud to said ears, the lower portion of said stud being threaded, a cup shaped member threaded on the lower end of said stud, a disc clamped in the bottom of said cup shaped member by said stud there being an aperture formed in the bottom of said cup shaped member and a tool shank, the upper end of which passes through said aperture and is swivelled to said disc.

2. The combination as set forth in claim 1 and there being oppositely disposed inclined faces formed on the upper end of said stud on opposite sides of its axis, for engaging the underside of the thimble and thereby limit the pivotal movement of said stud and parts carried thereby.

LOUIS FRANK.

REFERENCES CITED

The following references are of record in the file of this patent:

UNITED STATES PATENTS

| Number | Name | Date |
|---|---|---|
| 312,221 | Pruim | Feb. 10, 1885 |
| 348,765 | Neal | Sept. 7, 1886 |
| 487,123 | Knudsen | Nov. 29, 1892 |
| 453,211 | Rivett | June 2, 1891 |
| 922,080 | Bowers | May 18, 1909 |
| 1,057,101 | Wachter | Mar. 25, 1913 |
| 1,797,614 | Lazzarini | Mar. 24, 1931 |

FOREIGN PATENTS

| Number | Country | Date |
|---|---|---|
| 150,599 | Austria | Sept. 10, 1937 |